March 11, 1941.  M. TIBBETTS  2,234,392

MOTOR VEHICLE

Filed July 27, 1938

INVENTOR.
Milton Tibbetts
BY Tibbetts & Hart
ATTORNEYS

Patented Mar. 11, 1941

2,234,392

UNITED STATES PATENT OFFICE 2,234,392

MOTOR VEHICLE

Milton Tibbetts, Detroit, Mich., assignor to Packard Motor Car Company, Detroit, Mich., a corporation of Michigan Application July 27, 1938, Serial No. 221,654

2 Claims. (Cl. 74—472)

This invention relates to motor vehicles and particularly to the motor control mechanism thereof.

The conventional motor vehicle is controlled, as far as speed is concerned, by what is termed an accelerator pedal mounted on the floor of the operator's compartment and tilted forwardly to open the motor throttle and spring-pressed rearwardly to close it. There is also an instrument board upon which the speedometer is mounted showing the operator the speed at which the vehicle is traveling.

The operator of a motor vehicle must be constantly on the alert and watch the speedometer to see that he does not exceed the various speed limits established in different states, municipalities, etc. To assist him in this motor governors have been developed with adjustments mounted on the instrument board within reach of the operator so that he may readily set the governor to a given speed and then drive with the motor throttle wide open knowing that the car cannot exceed the set speed of the governor. In this way he may drive in a state where the maximum speed is, say, fifty miles an hour, and set the governor at that speed and the car will not exceed it. Thus the driver does not have to constantly watch the speedometer and he may drive on straight sections of the road with his foot on the fully depressed accelerator pedal, which is much less fatiguing than driving on a partially depressed accelerator and always watching the speedometer to see that the maximum allowed speed is not exceeded.

One criticism of this governor arrangement has been that it is occasionally desirable to momentarily increase the vehicle speed somewhat for the purpose, for instance, of passing another vehicle, and there are also emergencies in which it is imperative that a higher speed should be instantly available, and the governor set-up referred to permits these excess speeds only after the operator has readjusted the governor by hand. This is inconvenient and it is sometimes impossible, due to the particular driving conditions at the time.

Some motor vehicles today are provided with what is termed an "overdrive" or an "underdrive," which is an additional gear usually mounted at the rear of the transmission or gear box. This may be a planetary gearing or an internal-external gearing, or any one of the numerous gearings for changing the ratio from a high gear to a lower one, and vice versa, and means are provided for quickly making the shift from one gear to another. The over or higher gear or drive is the cruising gear, the engine running slower for a given car speed, and the shift to the lower gear is made when sudden acceleration is required, as in passing another car, or when more torque is required, as in taking a grade. If a governor such as referred to is used in connection with such vehicle the desired additional speed or torque may not be obtained under some conditions and the driver's control of the car may be interfered with by the lack of response to the throttle opening.

Some of the governors referred to are provided with locking or sealing means, on the instrument board or elsewhere, so that the governor adjustment can be set for a desired speed and no change therein can be made without the key or the breaking of a seal. This is more frequently used where the car is driven by someone other than the owner, as with cars owned by corporations and driven by employees, the corporations wishing to dictate the maximum speed at which the cars may be driven. In other cases the owner of a car may leave it with his son, locking the governor at a speed which he does not want the son to exceed and retaining the key. These are very desirable features of these governors.

The present invention has for one of its objects maintaining the usefulness of the governor control described, but at the same time overcoming the criticism thereof so far as it relates to obtaining an excess speed for emergencies or other demands.

Another object of the invention is to utilize a governor such as described so that the operator may drive up to but not beyond the maximum desired speed without the necessity of constantly watching the speedometer and with the accelerator pedal in the easiest driving position, but at the same time providing a means for instantly obtaining the full power of the motor with the most natural driver operation, that is, with an additional foot movement on the accelerator pedal.

Another object of the invention is to provide a governor controlled motor with means operated by the accelerator pedal for instantly cutting out the governor and obtaining the full power of the motor.

Another object of the invention is to provide an adjustable governor with means for cutting out the governor, and with means whereby the governor adjustment can be locked in set position and the governor cut-out locked in inoperative position.

Another object of the invention is to provide quick acting means for shifting gear and cutting out the governor action for the purpose stated above.

Another object of the invention is to provide the operator of the vehicle with a single device, easily and conveniently operated, to cut out the governor action, thus restoring full throttle opening, as the gear shifter is moved to a lower gear position, so that full acceleration or full motor torque at the lower gear may be instantly available.

Other objects of the invention will appear from the following description taken in connection with the drawing, which forms a part of this specification, and in which.

Figure 1:
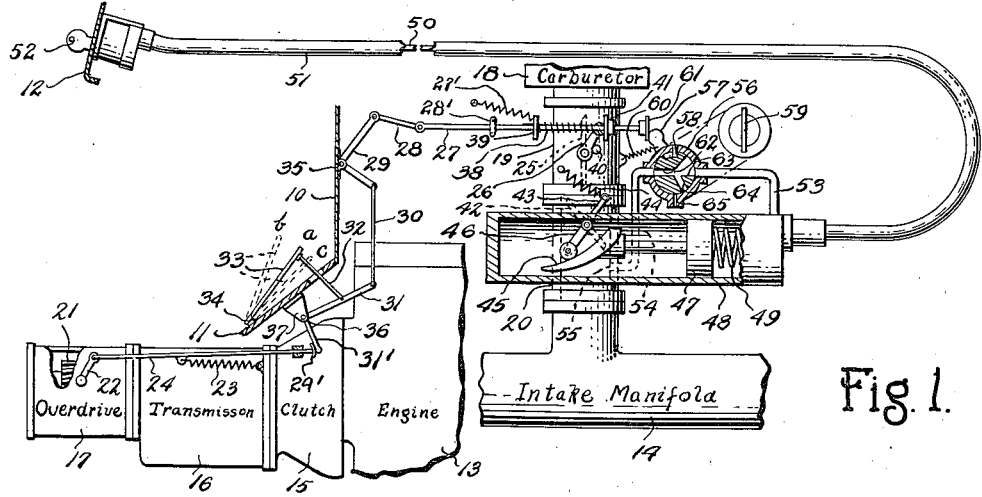
Figure 1 is a somewhat diagrammatic view of parts of the motor vehicle embodying the invention.
Figure 2:
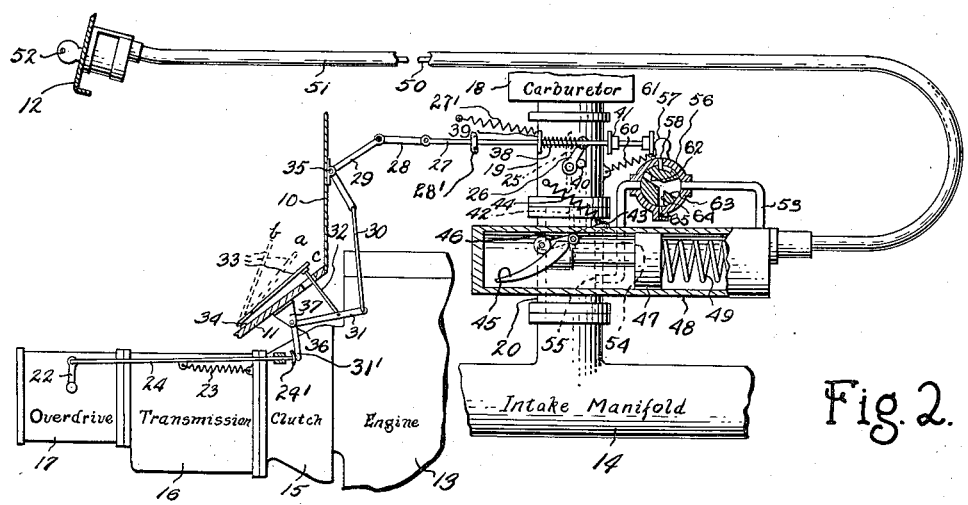
Figure 2 is a view similar to Figure 1 with the moving parts in another position.

Referring to the drawing, several parts of the motor vehicle are shown in Figures 1 and 2. The dash of the vehicle is shown at 10, the foot board at 11, and the instrument board at 12. The portion of the vehicle engine is shown at 13 and the intake manifold thereof at 14. The power plant of the vehicle consists of the motor 13, its clutch within the housing 15, the transmission or gearing in the housing 16, and the overdrive or underdrive gearing in the housing 17. The carburetor of the engine is shown at 18 and this connects with the intake manifold 14 through two sections of piping 19 and 20 respectively.

There are two means illustrated for controlling the operation of the vehicle, first, the overdrive or underdrive in the casing 17, this gearing being illustrated by the gear 21, and the gear shifter for this mechanism is indicated at 22, this being an arm suitably mounted in the casing 17. This gear shifter is yieldably held in one position by a spring 23, and it may be moved to its other position, which is preferably the lower gear position, by movement of the rod 24 towards the left in Figures 1 and 2.

The other means shown for controlling the vehicle are the two throttles mounted in series in the piping between the carburetor and the engine. The first of these throttles is the usual butterfly throttle valve shown in dotted lines at 25 and this is operated by an arm 26, a rod 27, guided at 28', a link 28, a bell crank 29, a rod 30, a lever 31, a rod 32, and a manually operated device 33 which is usually known as an accelerator pedal. The latter is pivoted at 34 to the floor board 11 of the vehicle. The bell crank 29 is suitably pivoted at 35 on the dash 10 of the vehicle and the lever 31 is pivoted at 36 on a bracket 37 on the floor board 11 of the vehicle. A spring 38 surrounding the rod 27 acts against a stop 39 on the rod and against the arm 26 to thus yieldingly force the throttle to open position as the rod 27 is moved towards the right. A stop 40 limits the movement of the arm 36, and an abutment 41 on the rod 27 causes the closing movement of the throttle arm 26 as the rod 27 is moved towards the left, as by the retracting spring 27'.

Thus the throttle 25 is under the direct control of the accelerator pedal 33 through the mechanism described above. The pedal is shown in full lines in Figure 1 in the full throttle open position, and the throttle 25 is shown in that position. This is position a of the accelerator pedal. Position b of the accelerator pedal is the throttle closed position thereof and position c of the accelerator pedal is the overtravel position which will be referred to later.

The second of the throttles referred to herein is the butterfly throttle valve 42 shown in nearly closed position in the piping 20 in Figure 1, this throttle being in series with the throttle 25, so that either may control the speed of the engine. It has an arm 43 and a spring 44 for yieldingly retaining the throttle valve in its closed position, but the valve is moved to its open position by a cam 45 operating against an arm 46 on the valve and operated by a piston 47 in a cylinder 48 with a spring 49 behind the piston 47. The spring 49 is adjustable by means of a rod or cable 50 extending through a flexible conduit 51 which leads to the instrument panel 12 of the vehicle. The rod 50 may be moved by a key 52 to adjust the governor spring 49 and when the key is removed the rod 50 is locked and consequently the adjustment of the governor spring is locked and cannot be changed without the key 52.

The governor action is effected by the changes in degree of vacuum in the engine manifold operating in opposition to the spring 49. Thus the right-hand end of the cylinder 48 is connected by the pipes 53 and 54 to the engine intake between the throttles and the engine cylinders, as at 55. A valve 56, shown in somewhat enlarged form in Figures 1 and 2, completes the connection between the pipes 53 and 54, and this valve is operated by an arm 57, a stop 58 determining its two extremes of movement. The valve may be locked in one or the other of those positions by the key 59 shown in Figures 1 and 3. A spring 60 yieldingly retains the valve 56 in one of its two positions and it may be moved from the position shown in Figure 1 to the position shown in Figure 2 by an extension 61 of the rod 27. Also, the arm 57 by reason of its spring 60 and its relationship to the rod 27 forms a yieldable stop for the accelerator pedal 33 in its a position, as shown in full lines in Figure 1, and in this position of the accelerator pedal it is easy for the driver to hold the throttle valve in its fully open position.

In the operation of the vehicle the engine suction or vacuum in the intake manifold 14 is communicated to the cylinder 48 back of the piston 47 and as this vacuum increases the cam 45 is withdrawn and the throttle valve 42 moves towards a more closed position, thus limiting the maximum speed of the engine as determined by the adjustment of the spring 49. Of course, as the vacuum drops the spring 49 moves the piston 47 towards the left and tends to open the throttle valve.

In the usual operation of the vehicle, by the owner himself, or by one who does not wish to be restricted by the governor action except to have the governor operate as long as the accelerator pedal is in its a position, the governor spring 49 may be set by manipulation of the key 52 to the desired tentative maximum speed and then, with the accelerator pedal 33 in its a position, the vehicle will not exceed that speed. However, if the operator desires the full power of the engine, as for passing another vehicle, further pressure of the accelerator pedal will move it to position c against the action of the spring 60, the throttle 25 remaining in fully open position by reason of the spring 38 and stop 40, and the valve 56 will then be moved to the position shown in Figure 2 in which it no longer connects the pipes 53 and 54. In this position of the valve 56 the passage 62 of the valve no longer registers with the pipe 54 and consequently the connection between the pipes is broken. However, the passage 63 still registers with the pipe 53 and a connecting passage 64 now connects with the atmosphere through a small passage 65, so that the vacuum in the cylinder 48 is broken and there is atmospheric pressure on both sides of the piston 47 leaving the spring 49 free to operate to move the throttle 42 to wide open position as it is shown in Figure 2. The passage 65 is made small so that the piston 47 will not act too quickly and yet will move the throttle 42 to open position sufficiently rapidly for the purpose. Now with the governor cut out by reason of movement of the valve 56 the throttle valve 42 is wide open, and since the accelerator pedal 33 is in its c position the throttle valve 25 is also wide open, and the maximum power of the engine is available to the operator. When the operator returns the accelerator pedal to position a or anywhere between that position and position b, the valve 56 is returned by the spring 60 to the position shown in Figure 1 and the governor is again in operation.

As previously stated, means are provided for locking the governor in its adjusted position, that is, by removing the key 52. This, however, would be unavailing unless the governor cut-out was also rendered inoperative and this invention therefore provides for a lock for the valve 56. Provision may be made so that the lock operated by the key 52 will also lock the valve 56 or a separate lock may be provided for the valve 56. As shown herein there is a separate lock though the same key may be used for both.

Figure 3:
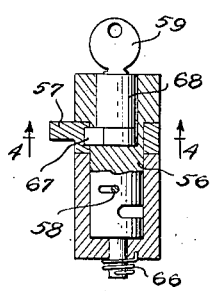
Figure 3 is an enlarged view of the valve locking mechanism.
Figure 4:
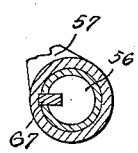
Figure 4 is a section on the line 4—4 of Figure 3 showing the locking bolt in one position.
Figure 5:
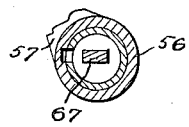
Figure 5 is a similar view with the locking bolt in another position.

Since the arm 57 is the means for moving the valve 56 the valve will be locked when the arm 57 is disconnected from it. Thus in Figures 3, 4, and 5 the rotating part of the valve 56 is retained in its governor-operating position, as shown in Figure 1, by a spring 66. The arm 57 surrounds the rotary part of the valve and is connected to it by a bolt 67 operated by a tumbler lock 68. In one position of the tumbler lock the bolt 67 connects the arm 57 to the valve 56, Figures 3 and 4 showing it in this position. In Figure 5 the bolt 67 has been withdrawn and the arm 57 is free so that any movement thereof will have no effect upon the valve 56 and therefore, with the parts in that position, the valve 56 is locked and movement of the accelerator pedal to the position c will not move the valve.

For the purpose of more clearly illustrating the valve 56 and its operation it is shown somewhat diagrammatically and as a part separate from the cylinder 48, but it will be understood that the valve would probably be built into the cylinder 48 and would of course be encased so that when locked it could not be moved from one position to another except by use of the key.

The gear shifter 22 for the overdrive has been described as operated by the rod 24, being retained in its higher geared position by the spring 23. The present invention provides for moving the gear shifter to its lower geared position by the same movement that produces the full power of the motor by cutting out the governor. Thus an arm 31' on the lever 31 operates against the head 24' of the rod 24 to move the rod 24 to the left when the accelerator pedal 33 is moved to its c position. This moves the gear shifter 22 against the action of the spring 23 and produces the lower gear of the overdrive. At the same time the accelerator pedal movement has moved the throttle 25 to fully open position and has moved the valve 56 to the position shown in Figure 2 so that the governor is cut out of action and the valve 42 is in wide open position. Thus simultaneously the lower gear of the vehicle and the full power of the motor are obtained for emergency use. When the pedal 33 is returned to position a or between that position and position b the overdrive goes into high gear and the governor returns to its normal operation.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Thus it is obvious that the valve 56 and the gear shifter 22, either or both of them, instead of being operated mechanically from the manually actuated lever 33, may be operated electrically as through solenoids and wiring or hydraulically through suitable cylinders, pistons, and piping.

What I claim is:

1. In a motor vehicle, the combination of a motor having throttle means, a governor, an accelerator for controlling motor speed below the governed speed, a gear shifter for the vehicle, and means operated by said accelerator to simultaneously actuate the gear shifter, render the governor inoperative and move said motor throttle means to wide open position.

2. In a motor vehicle, the combination of a motor having throttle means, a governor connected to said throttle means to normally limit the motor speed, an accelerator connected to said throttle means for normally controlling the motor speed below the governed speed, a gear shifter for the vehicle, and means operated by movement of said accelerator to simultaneously actuate the gear shifter, render the governor inoperative and move the entire throttle means of the motor to wide open position, whereby the full acceleration of the vehicle is obtained.

MILTON TIBBETTS.